United States Patent
Verdun

(10) Patent No.: US 6,901,523 B2
(45) Date of Patent: May 31, 2005

(54) METHOD AND APPARATUS FOR INFORMATION HANDLING SYSTEM SLEEP REGULATION

(75) Inventor: Gary J. Verdun, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 531 days.

(21) Appl. No.: 10/171,950

(22) Filed: Jun. 14, 2002

(65) Prior Publication Data

US 2003/0233588 A1 Dec. 18, 2003

(51) Int. Cl.[7] .............................. G06F 1/26; G06F 1/32
(52) U.S. Cl. ...................................... 713/320; 715/323
(58) Field of Search .............................. 713/330, 320, 713/321, 323, 324

(56) References Cited

U.S. PATENT DOCUMENTS

| | | | |
|---|---|---|---|
| 5,167,024 A | * 11/1992 | Smith et al. | ............ 713/322 |
| 5,172,790 A | * 12/1992 | Ishikawa et al. | ............ 180/268 |
| 5,241,680 A | 8/1993 | Cole et al. | |
| 5,623,677 A | 4/1997 | Townsley et al. | |
| 5,737,616 A | * 4/1998 | Watanabe | ............ 713/340 |
| 5,925,134 A | 7/1999 | Solomon | |
| 5,954,820 A | * 9/1999 | Hetzler | ............ 713/323 |
| 6,092,207 A | * 7/2000 | Kolinski et al. | ............ 713/323 |
| 6,115,033 A | 9/2000 | Choi | |
| 6,347,379 B1 | 2/2002 | Dai et al. | |
| 6,366,061 B1 | 4/2002 | Carley et al. | |
| 6,523,128 B1 | * 2/2003 | Stapleton et al. | ............ 713/330 |

* cited by examiner

*Primary Examiner*—Thomas Lee
*Assistant Examiner*—Vincent Tran
(74) *Attorney, Agent, or Firm*—Haynes and Boone, LLP

(57) ABSTRACT

An information handling system includes a microprocessor, a storage, a plurality of devices operatively connected to said microprocessor and a run voltage rail, a sleep regulator, and a power management controller. The plurality of devices are further operatively connected to a run voltage power rail to operate in a run mode in response to a run voltage Vrun applied to the run voltage power rail. The sleep regulator provides a sleep voltage Vsleep output. Lastly, the power management controller determines a power savings sleep voltage for a run/sleep mode power management condition and controls the sleep power voltage output of the sleep regulator according to the power savings sleep voltage. The power management controller is further configured to enable select ones of the plurality of devices to be operatively disconnected from the Vrun power rail and connected to the sleep voltage Vsleep output, wherein devices operatively connected to the sleep voltage Vsleep output operate in a sleep power mode.

23 Claims, 3 Drawing Sheets

METHOD AND APPARATUS FOR INFORMATION HANDLING SYSTEM SLEEP REGULATION

BACKGROUND

The present disclosure relates generally to information handling systems, and more particularly to a method and apparatus for information handling system sleep regulation.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In conjunction with information handling systems, current processors and graphics controllers are implementing multiple performance modes where the device clock and voltage are both reduced in the lower performance state in order to reduce the power of the device. The devices also typically support an idle state where the voltage on the device is reduced to a very low voltage in order to reduce the leakage current when the device is basically doing no useful work. This requires a voltage regulator dedicated to the device implementing voltage reduced operation. Portable computers may have a large number of devices in such an idle state while in battery operation. The devices currently maintain full voltage and resultant leakage power because the cost of implementing individual power supplies for all devices is prohibitive.

One prior method for addressing the problem discussed above has been implemented for processors, through a reduced idle voltage provided by an Intel Mobile Voltage Positioning (IMVP) device and in particular, it's implementation of a reduced voltage idle state denoted as Deeper Sleep. However, this method has various disadvantages, for example, in that a number of other devices besides the processor may still be in a full voltage idle state while doing no useful work and resulting in poor power management.

Accordingly, it would be desirable to provide a method and apparatus for solving the problem of sleep regulation absent the disadvantages found in the prior methods discussed above.

SUMMARY

According to one embodiment, an information handling system includes a microprocessor, a storage, a plurality of devices operatively connected to said microprocessor and a run voltage rail, a sleep regulator, and a power management controller. The plurality of devices are further operatively connected to a run voltage power rail to operate in a run mode in response to a run voltage Vrun applied to the run voltage power rail. The sleep regulator provides a sleep voltage Vsleep output. Lastly, the power management controller determines a power savings sleep voltage for a run/sleep mode power management condition and controls the sleep power voltage output of the sleep regulator according to the power savings sleep voltage. The power management controller is further configured to enable select ones of the plurality of devices to be operatively disconnected from the Vrun power rail and connected to the sleep voltage Vsleep output, wherein devices operatively connected to the sleep voltage Vsleep output operate in a sleep power mode.

DETAILED DESCRIPTION

According to one embodiment of the present disclosure, a method and system apparatus are disclosed for run/sleep mode power management in an information handling system. The method and system can be better understood by reference to the flow charts, drawing figures, and additional discussion included herein.

Figure 1:
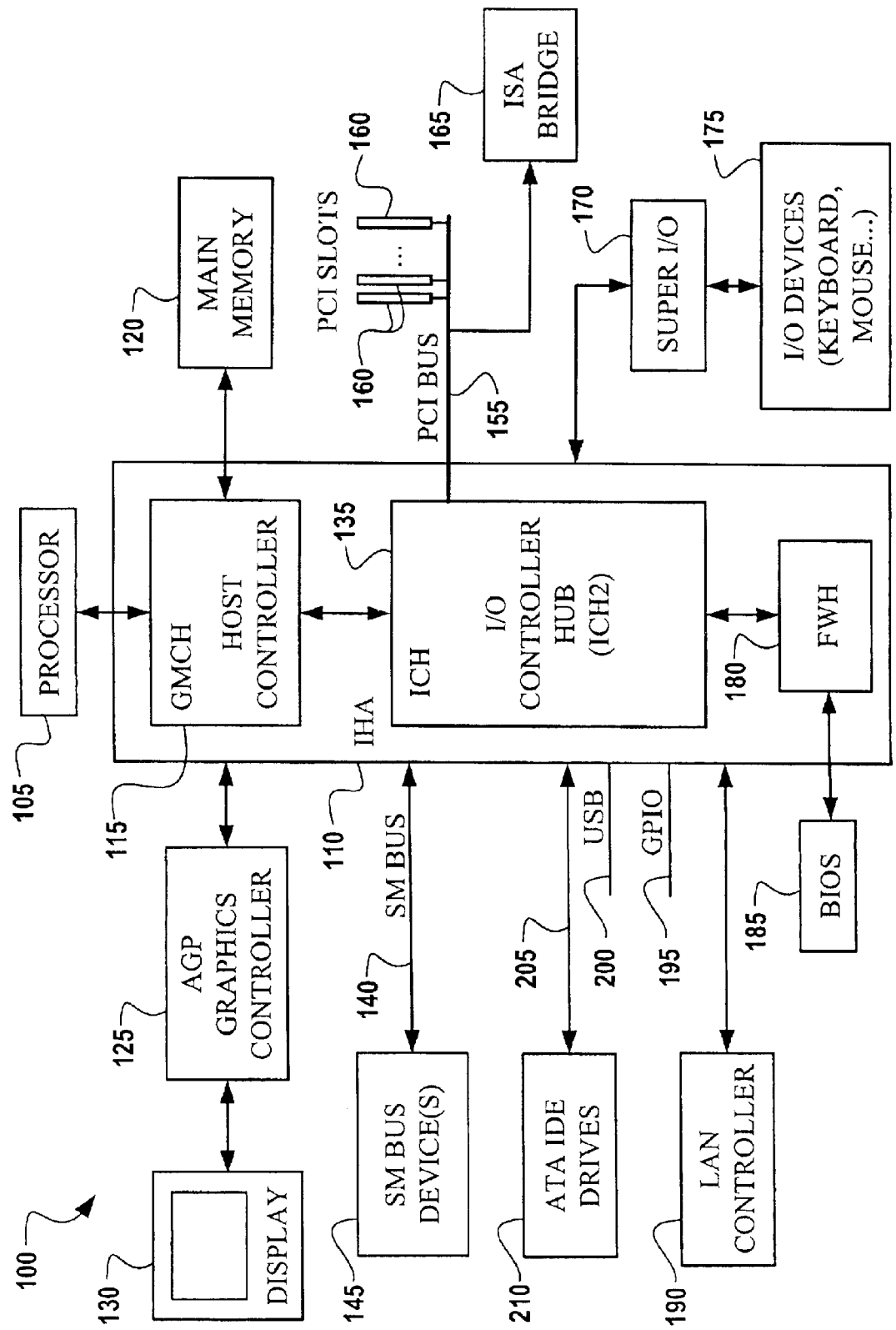
FIG. 1 illustrates a block diagram view of an information handling system having run/sleep mode power management according to an embodiment of the present disclosure.

FIG. 1 depicts a high level block diagram of an information handling system 100 in which the disclosed technology is practiced. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The particular information handling system 100 depicted in FIG. 1 is a portable computer which includes a processor 105. An Intel Hub Architecture (IHA) chipset 110 provides system 100 with memory and I/O functions. More particularly, IHA chipset 110 includes a Graphics and AGP Memory Controller Hub (GMCH) 115. GMCH 115 acts as a host controller that communicates with processor 105 and further acts as a controller for main memory 120. GMCH 115 also provides an interface to Advanced Graphics Port (AGP) controller 125 which is coupled thereto. A display 130 is coupled to AGP controller 125. IHA chipset 110 further includes an I/O Controller Hub (ICH) 135 which performs numerous I/O functions. ICH 135 is coupled to a System Management Bus (SM Bus) 140 which is coupled to one or more SM Bus devices 145.

ICH 135 is coupled to a Peripheral Component Interconnect (PCI) bus 155 which is coupled to mini PCI connector slots 160 which provide expansion capability to portable computer 100. A super I/O controller 170 is coupled to ICH 135 to provide connectivity to input devices such as a keyboard and mouse 175 as shown in FIG. 1. A firmware hub (FWH) 180 is coupled to ICH 135 to provide an interface to system BIOS 185 which is coupled to FWH 180. A General Purpose I/O (GPIO) bus 195 is coupled to ICH 135. USB ports 200 are coupled to ICH 135 as shown. USB devices such as printers, scanners, joysticks, etc. can be added to the system configuration on this bus. An integrated drive electronics (IDE) bus 205 is coupled to ICH 135 to connect IDE drives 210 to the computer system.

Figure 2:
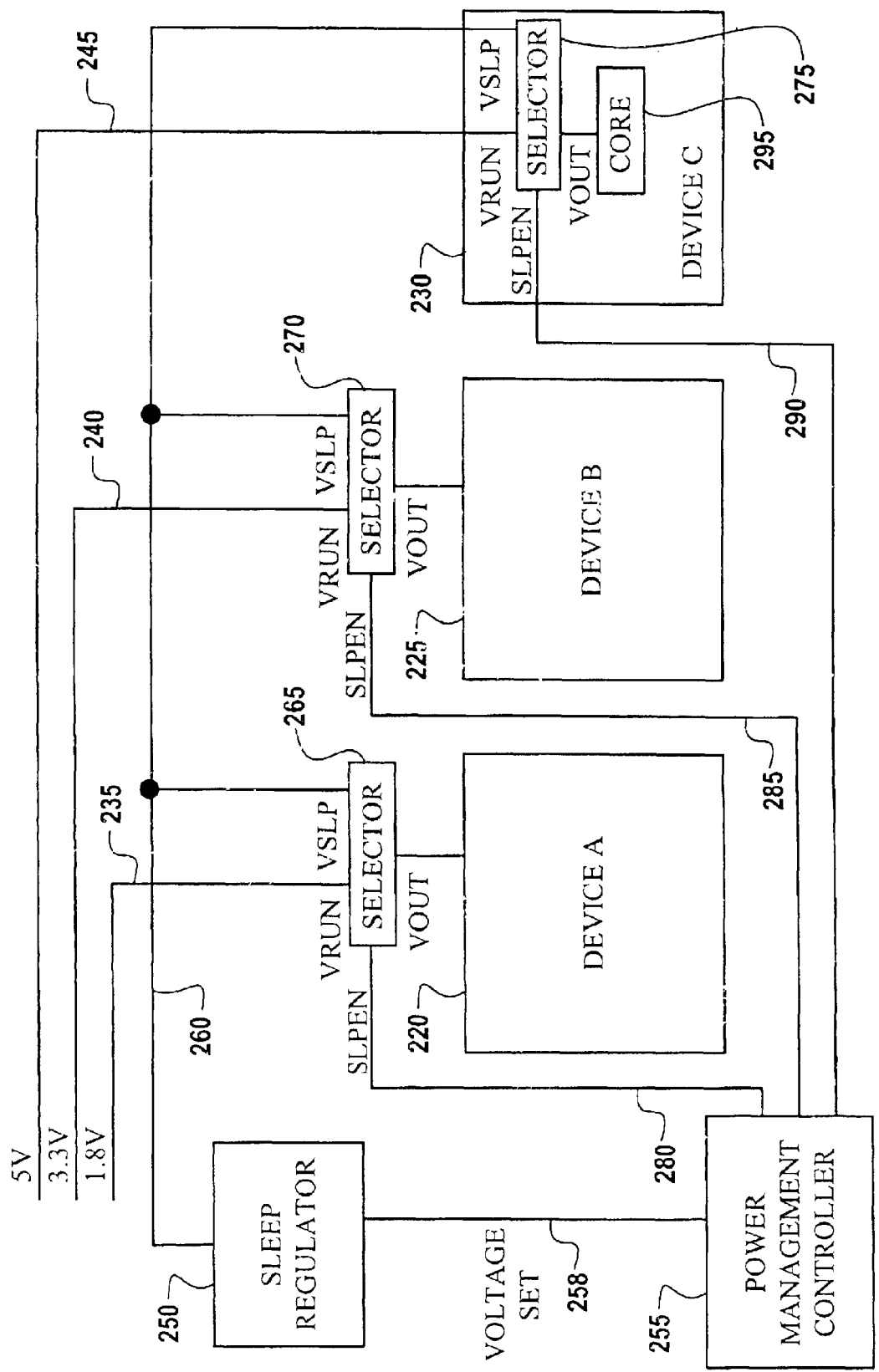
FIG. 2 illustrates a block diagram view of a portion of the information handling system having run/sleep mode power management in further detail according to an embodiment of the present disclosure.

As shown in FIG. 1, in the information handling system 100, a plurality of devices are operatively connected to microprocessor 105. Referring now to FIG. 2, a portion of the information handling system 100 includes a plurality of devices (220, 225, 230) operatively connected to a run voltage power rail. The plurality of devices (220, 225, 230) may include a plurality of the devices of FIG. 1 having an ability to operate in a sleep mode and full power mode. In FIG. 2, device 220 is operatively coupled to a first run voltage power rail 235, device 225 is operatively coupled to a run voltage power rail 240, and device 230 is operatively coupled to a run voltage power rail 245. While three run voltage power rails are shown, the present embodiments can be applicable to any number of run voltage power rails. The plurality of devices (220, 225, 230) operate in a run mode in response to a run voltage Vrun applied to the run voltage power rail. As shown, power rail 235 can represent a 1.8 volt power rail, power rail 240 can represent a 3.3 volt power rail, and power rail 245 can represent a 5 volt power rail.

The information handling system 100 further includes a sleep regulator 250 and a power management controller 255. The sleep regulator 250 is configured to provide a sleep voltage Vsleep output on sleep rail 260. The power management controller 255 is configured to determine a power savings sleep voltage for a run/sleep mode power management condition and to control the sleep power voltage output of the sleep regulator 250 according to the power savings sleep voltage, via a voltage set signal 258. The power management controller 255 is further configured to enable select ones of the plurality of devices (220, 225, 230) to be operatively disconnected from the Vrun power rail (235, 240, 245) and connected to the sleep voltage Vsleep output 260. As a result, devices that are operatively connected to the sleep voltage Vsleep output operate in a sleep power mode.

In one embodiment, the power management controller 255 determines the power savings sleep voltage from a look-up table of power savings as a function of sleep voltages for respective ones of the plurality of devices, further as discussed herein below.

In another embodiment, the power management controller 255 determines the power savings sleep voltage from a calculation of power savings as a function of sleep voltages for respective ones of the plurality of devices. The power management controller can also be configured perform the calculation of power savings in real-time.

Still further, the power management controller 255 may be configured to render a device of the plurality of devices (220, 225, 230) operative in the run mode in response to a determination that an overall power savings of the plurality of devices could be achieved by rendering the device operative in a run mode. The power management controller 255 operates to render the device operative in the run mode in this manner, even though, the device would otherwise be operative in a sleep mode for reasons other than power savings.

Still referring to FIG. 2, the information handling system further includes a plurality of Vrun/Vsleep power selectors (265, 270, 275). The plurality of Vrun/Vsleep power selectors (265, 270, 275) operatively connect to corresponding ones of the plurality of devices (220, 225, 230). In this embodiment, the power management controller 255 is further configured to output sleep enable signals (280, 285, 290) to the plurality of Vrun/Vsleep power selectors (265, 270, 275), respectively. That is, the power management controller 255 outputs the output sleep enable signals (280, 285, 290) according to the run/sleep mode power management condition. In addition, a respective Vrun/Vsleep power selector (265, 270, 275) operates in response to a corresponding sleep enable signal (280, 285, 290) to connect a respective one of the devices (220, 225, 230) to either the run power voltage Vrun or the sleep power voltage Vsleep. The Vrun/Vsleep power selectors can be disposed either internal (275) or external (265, 270) to a respective one of the plurality of devices.

Furthermore, the information handling system includes a sleep power rail 260. The sleep regulator 250 outputs the sleep voltage to the sleep power rail 260. In addition, the power management controller 255 enables select ones of the plurality of devices (220, 225, 230) to be operatively disconnected from the run voltage power rail and operatively connected to the sleep power rail, for example, via the Vrun/Vsleep power selectors (265, 270, 275).

According to one embodiment, the method and apparatus of the present disclosure utilize a single low voltage sleep power rail for a plurality of devices to share. Each device includes a "sleep" power rail input operable for being connected to the sleep regulator. For example, device 230 may have an internal selector 275 for enabling the device to connect the internal electronics 295 either to the run power rail 245 or the sleep power rail 260. The voltage setting of the sleep power rail is established as further discussed herein.

Power management software/controller 255 establishes a voltage setting for the sleep rail, setting the sleep rail to a lowest voltage allowed by devices to be connected to it. In one embodiment, the sleep voltage includes the highest of possible minimum sleep mode voltages of devices to be attached to rail. If a device to be added requires a higher rail voltage, then the power management controller 255 can determine if it would be better to raise the voltage of all current devices on the sleep rail 260 and add the new device or keep the voltage of the sleep rail as is, without adding the new device to the sleep rail.

Implementing the method and system apparatus as discussed herein would allow for a lower system power with minimal added cost to the system, accordingly extending the battery life of a portable computer. This method may also be used as a method of reducing thermals and/or keeping system power below maximum capabilities of main power rails.

With respect to the various devices in the information handling system, each device will typically have a minimum sleep voltage. Operation or recovery of the device state information cannot be maintained below this voltage. Devices will continue to function if the voltage is above this sleep voltage but below the maximum operating voltage of the part. A side effect of operating in the sleep mode with the voltage higher than the minimum sleep voltage is higher power dissipation.

When more than one device are required to go into the low power sleep state, the sleep rail voltage must be set to the higher of the two minimum operating "sleep" voltages. The system software or power management controller is configured with a method of calculating the relative power savings of the different component/sleep rail voltage combinations.

One such method would be to determine all the minimum (sleep) voltages for all the devices in the system. This will be required in order to have the proper values to program the sleep regulator. Static power for each device in the system at each of these potential operating voltages can then be obtained either empirically or through the use of a mathematical model. The power savings for each device at each potential sleep voltage relative to the power consumed at run voltage for the device can be derived empirically or by calculation and entered into the table. Although possible to calculate power for a device on the fly in real time, in a preferred embodiment, a table look up is implemented instead to reduce power management controller overhead.

The table could consist of the power savings relative to normal operation or a list of actual powers including a line item for normal operation. Recording the actual savings will eliminate the need to calculate this on the fly. A table of the following sort can then be created and stored in a nonvolatile fashion in the system.

TABLE 1

Device power savings relative to normal operation when in sleep mode at the specified voltage. NO indicates device is not operational at this voltage. The minimum sleep voltage if any device is the lowest voltage entry not containing "NO".

|  | Device A | Device B | Device C |
| --- | --- | --- | --- |
| Device Power Normal Operation | .5 | 2.5 | 1.8 |
| Savings Relative to normal | | | |
| Sleep Voltage | Device A | Device B | Device C |
| .85 | .4 | NO | NO |
| .9 | .388 | 2.25 | NO |
| 1.05 | .189 | 2.16 | 1.5 |

The following two example cases have been provided to illustrate the calculations necessary to compare two potential savings states.
Case 1:
Device B (225) is the only device currently capable of going into the low power state. Current savings is 0 (no devices in sleep state). Power savings of Device B (225) in Sleep, with a minimum voltage of B at 0.9V, is 2.25W.
Case 2:
Device A (220) and Device B (225) can Both go into Sleep state. Current Power Savings is 2.25W. Possible device/sleep voltage combinations are:
 1. A by itself at the Device A minimum sleep voltage (0.85)—The Power Savings of device A at the device A minimum voltage of (0.85V) is 0.4W
 2. A and B both at the Device B minimum voltage (0.9V)—Power Savings are:
    Device A=0.388 and Device B=2.25
    Total Power Savings=2.25+0.388=2.638W
Power management controller or software would calculate the above and determine that the only option with greater savings than the current setting is A and B at device B minimum voltage (0.9V). The change to this new configuration would then be accomplished and the next potential state change would have the current power savings of 2.638W as the new baseline for comparison.

Note that for any possible set of devices, the possible combinations that need to be calculated are equal to the number of minimum voltage set points supported by this set of devices. One could begin calculating at the minimum sleep voltage supported and calculate higher usable supported voltages in succession until all devices able to go into a sleep state have been included. This would be the minimum compliment of calculations necessary.

Figure 3:
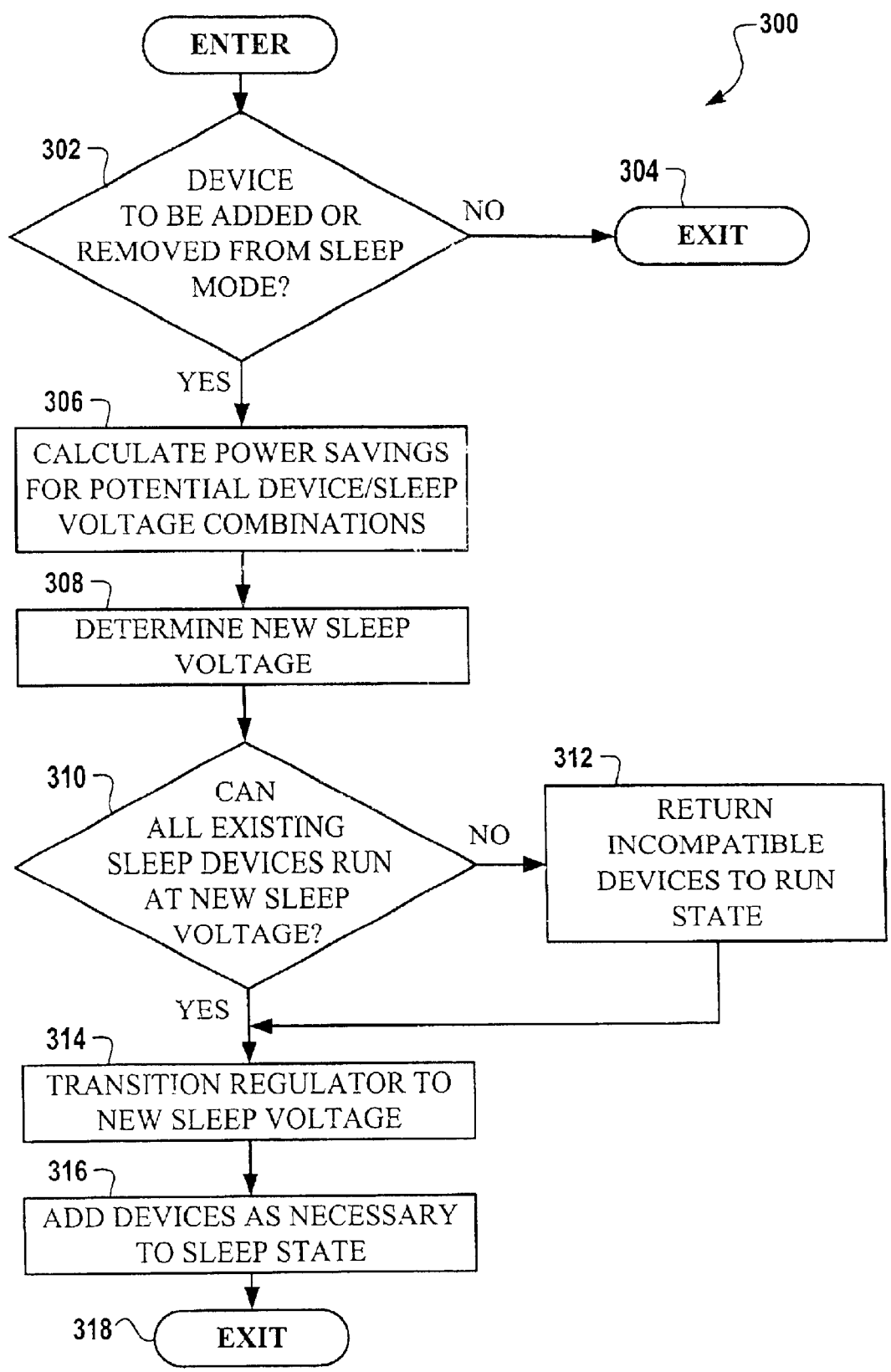
FIG. 3 shows a flow chart for a run/sleep mode power management method according to one embodiment of the present disclosure.

Referring now to FIG. 3, according to another embodiment, a method 300 for implementing run/sleep mode power management in an information handling system includes querying whether a device of a plurality of devices in the information handling system is to be added to or removed from a sleep mode at 302. If none, then the run/sleep mode power management ends as 304. With respect to the sleep mode, each device of the plurality of devices is configured to have a respective minimum sleep voltage, below which operation or recovery of device state information cannot be maintained. In response to the device being added to or removed from the sleep mode, a power savings sleep voltage is updated. The power savings sleep voltage being a function of a cumulative power savings for various device/sleep voltage combinations of the plurality of devices.

For example, in step 306, the power management controller calculates power savings for potential device/sleep voltage combinations. In step 308, the power management controller determines the new or updated sleep voltage. Upon determination of the updated sleep voltage, at 310, the power management controller queries whether all existing sleep devices can run at the new or updated sleep voltage. If not, then at 312, the power management controller is configured to return incompatible devices to the run state. The process continues at 314.

In response to determining the updated power savings sleep voltage, a sleep regulator is transitioned to the new or updated power savings sleep voltage (at 314). If removing the device from the sleep mode, then the device is added to the run mode at a run voltage (at 312). Otherwise, the device is added to the sleep mode at the updated power savings sleep voltage of the sleep regulator (at 316). The sleep mode power management then exits at 318.

The power savings sleep voltage is a function of a cumulative power savings for various device/sleep voltage combinations of the plurality of devices. For example, in one embodiment, updating the power savings sleep voltage includes calculating a cumulative power savings for various potential device/sleep voltage combinations of the plurality of devices. Calculating the cumulative power savings can be accomplished in real-time. In addition, updating the power savings sleep voltage can include determining the updated power savings sleep voltage from a calculation of power savings as a function of sleep voltages for respective ones of the plurality of devices.

In another embodiment, updating the power savings sleep voltage includes determining the updated power savings sleep voltage from a look-up table of power savings as a function of sleep voltages for respective ones of the plurality of devices.

Furthermore, the method includes rendering a device of the plurality of devices operative in the run mode in response to a determination that an overall power savings of the plurality of devices could be achieved by rendering the device operative in the run mode. Such a determination is made based upon an overall power savings of the devices, even though, the particular device being rendered operative in the run mode would otherwise be operative in a sleep mode for reasons other than total system power savings.

According to another embodiment of the present disclosure, a computer program for run/sleep power management is processable by an information handling system for causing the information handling system to determine a power savings sleep voltage for a run/sleep mode power management condition of a plurality of devices, control a sleep power voltage output of a sleep regulator according to the power savings sleep voltage, and enable select ones of the plurality of devices to be operatively disconnected from the Vrun power rail and connected to the sleep voltage Vsleep output. The various functionalities described herein for the computer program may be implemented using programming techniques known in the art.

Devices operatively connected to the run voltage power rail operate in a run mode in response to a run voltage Vrun applied to the run voltage power rail. Devices operatively connected to the sleep voltage Vsleep output operate in a sleep power mode.

In one embodiment, the computer program determines the power savings sleep voltage for the run/sleep mode power management of the plurality of devices from a look-up table of power savings as a function of sleep voltages for respective ones of the plurality of devices.

In another embodiment, the computer program determines the power savings sleep voltage for the run/sleep mode power management of the plurality of devices from a calculation of power savings as a function of sleep voltages for respective ones of the plurality of devices. The calculation of power savings can be done in real-time.

In addition, the computer program is further processable by the information handling system for causing the information handling system to render a device of the plurality of devices operative in the run mode. In this instance, the device is rendered operative in the run mode in response to a determination that an overall power savings of the plurality of devices could be achieved by rendering the device operative in the run mode, even though, the device could otherwise be operative in a sleep mode for reasons other than power savings.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a microprocessor;
    a storage coupled to said microprocessor;
    a plurality of devices operatively connected to said microprocessor, and further being operatively connected to a run voltage power rail and configured to operate in a run mode in response to a run voltage Vrun applied to the run voltage power rail;
    a sleep regulator configured to provide a sleep voltage Vsleep output; and
    a power management controller, configured to determine a power savings sleep voltage for a run/sleep mode power management condition and to control the sleep power voltage output of said sleep regulator according to the power savings sleep voltage, and further configured to enable select ones of the plurality of devices to be operatively disconnected from the Vrun power rail and connected to the sleep voltage Vsleep output, whereby devices operatively connected to the sleep voltage Vsleep output operate in a sleep power mode.

2. The information handling system of claim 1, wherein said power management controller determines the power savings sleep voltage from a look-up table of power savings as a function of sleep voltages for respective ones of the plurality of devices.

3. The information handling system of claim 1, wherein said power management controller determines the power savings sleep voltage from a calculation of power savings as a function of sleep voltages for respective ones of the plurality of devices.

4. The information handling system of claim 3, wherein said power management controller performs the calculation of power savings in real-time.

5. The information handling system of claim 1, wherein said power management controller is further configured to render a device of the plurality of devices operative in the run mode in response to a determination that an overall power savings of the plurality of devices could be achieved by rendering the device operative in a run mode, even though, the device would otherwise be operative in a sleep mode for reasons other than total system power savings.

6. The information handling system of claim 1, further comprising:
    a plurality of Vrun/sleep power selectors, wherein respective ones of said plurality of Vrun/sleep power selectors operatively connect to corresponding respective ones of the plurality of devices; and wherein said power management controller is further configured to output sleep enable signals to said plurality of Vrun/Vsleep power selectors.

7. The information handling system of claim 6, wherein said power management controller outputs the output sleep enable signals according to the run/sleep mode power management condition.

8. The information handling system of claim 7, wherein a respective Vrun/sleep power selector operates in response to a corresponding sleep enable signal to connect a respective one of the devices to one of the run power voltage Vrun and the sleep power voltage Vsleep.

9. The information handling system of claim 6, wherein said Vrun/sleep power selectors are disposed to one of internal and external to a respective one of the plurality of devices.

10. The information handling system of claim 1, further comprising:
    a sleep power rail, wherein said sleep regulator outputs the sleep voltage to the sleep power rail and further wherein said power management controller enables select ones of the plurality of devices to be operatively disconnected from the run voltage power rail and operatively connected to the sleep power rail.

11. A method for implementing run/sleep mode power management in an information handling system, the method comprising:
    querying whether a device of a plurality of devices in the information handling system is to be added to removed from a sleep mode;
    in response to the device being added to or removed from the sleep mode, updating a power savings sleep voltage, the power savings sleep voltage being a function of a power savings for various device/sleep voltage combinations of the plurality of devices;

transitioning a sleep regulator to the updated power savings sleep voltage; and if removing the device from the sleep mode, then adding the device to the run mode at a run voltage, otherwise adding the device to the sleep mode at the updated power savings sleep voltage of the sleep regulator.

12. The method of claim 11, wherein the power savings sleep voltage is a function of a cumulative power savings for various device/sleep voltage combinations of the plurality of devices.

13. The method of claim 11, wherein updating the power savings sleep voltage includes calculating a cumulative power savings for various potential device/sleep voltage combinations of the plurality of devices.

14. The method of claim 13, wherein calculating the cumulative power savings is in real-time.

15. The method of claim 11, wherein updating the power savings sleep voltage include determining the updated power savings sleep voltage from a look-up table of power savings as a function of sleep voltages for respective ones of the plurality of devices.

16. The method of claim 11, wherein updating the power savings sleep voltage include determining the updated power savings sleep voltage from a calculation of power savings as a function of sleep voltages for respective ones of the plurality of devices.

17. The method of claim 11, wherein each device of the plurality of devices is configured to have a respective minimum sleep voltage, below which operation or recovery of device state information cannot be maintained.

18. The method of claim 11, further comprising:

rendering a device of the plurality of devices operative in the run mode in response to a determination that an overall power savings of the plurality of devices could be achieved by rendering the device operative in a run mode, even though, the device would otherwise be operative in a sleep mode for reasons other than total system power savings.

19. A computer program for run/sleep power management, the computer program processable by an information handling system for causing the information handling system to:

determine a power savings sleep voltage for a run/sleep mode power management condition of a plurality of devices operatively connected to a microprocessor and further being operatively connected to a run voltage power rail, the devices configured to operate in a run mode in response to a run voltage Vrun applied to the run voltage power rail;

control a sleep power voltage output of a sleep regulator according to the power savings sleep voltage; and enable select ones of the plurality of devices to be operatively disconnected from the Vrun power rail and connected to the sleep voltage Vsleep output, wherein devices operatively connected to the sleep voltage Vsleep output operate in a sleep power mode.

20. The computer program of claim 19, wherein the power savings sleep voltage is determined from a look-up table of power savings as a function of sleep voltages for respective ones of the plurality of devices.

21. The computer program of claim 19, wherein the power savings sleep voltage is determined from a calculation of power savings as a function of sleep voltages for respective ones of the plurality of devices.

22. The computer program of claim 21, wherein the calculation of power savings in done in real-time.

23. The computer program of claim 19, further processable by the information handling system for causing the information handling system to:

render a device of the plurality of devices operative in the run mode in response to a determination that an overall power savings of the plurality of devices could be achieved by rendering the device operative in a run mode, even though, the device would otherwise be operative in a sleep mode for reasons other than total system power savings.

* * * * *

UNITED STATES PATENT AND TRADEMARK OFFICE
CERTIFICATE OF CORRECTION

PATENT NO. : 6,901,523 B2
DATED : May 31, 2005
INVENTOR(S) : Gary J. Verdun

It is certified that error appears in the above-identified patent and that said Letters Patent is hereby corrected as shown below:

Column 8,
Lines 32, 33, 44 and 49, delete "Vrun/sleep" and insert -- Vrun/Vsleep --;
Line 64, delete "added to removed" and insert -- added to or removed --;

Column 10,
Line 29, delete "savings in done" and insert -- savings is done --.

Signed and Sealed this

Thirtieth Day of August, 2005

JON W. DUDAS
*Director of the United States Patent and Trademark Office*